United States Patent Office.

AARON VAN CAMP, OF WASHINGTON, DISTRICT OF COLUMBIA.

Letters Patent No. 74,733, dated February 18, 1868.

IMPROVEMENT IN PRESERVING EGGS.

The Schedule referred to in these Letters Patent and making part of the same.

TO ALL WHOM IT MAY CONCERN:

Be it known that I, AARON VAN CAMP, of Washington city, in the District of Columbia, have made a new and useful Improvement in Preserving Eggs; and I hereby declare the following to be a full and exact description of the same.

The nature of my invention consists in treating eggs with solutions of chemicals, as hereinafter described, so that they are preserved fresh, and without any injurious ingredient being added.

The following description will enable any one to use my invention. I take about ten pounds of unslaked lime, and eight pounds of common salt, and dissolve or mix them with twenty gallons of water. In this solution I place the fresh eggs to be preserved, and let them remain from ten to twenty days. I then dissolve, in a small quantity of water, the following substances, viz, one-quarter pound of chloride of calcium; one-half pound of liquid phosphoric acid; one pound chloride of lime (or bleaching-powder;) one-half pound of nitrate of potash. This solution I add to the former containing the eggs. In this preparation the eggs should remain for about thirty days before they are taken out or ready to market.

I have specified what I regard as the best preparations, but do not limit myself to them. Other saline substances may also be added, but those mentioned are sufficient for the purpose. The chloride of calcium prevents the eggs from drying up, and any other deliquescent salt may be substituted for it, but I prefer the chloride of calcium. Nitrate of soda, or other soluble nitrate, may be used instead of nitrate of potash, and any equivalent chloride compound may be used instead of the bleaching-powder.

Having described my invention, what I claim, and desire to secure by Letters Patent of the United States, is—

1. The process herein described for preserving eggs.
2. The use of chloride of calcium or its equivalent, for the purpose of preserving eggs.
3. I claim phosphoric acid as material for preserving eggs.
4. I claim the combination of the ingredients herein mentioned for preserving eggs.

A. VAN CAMP.

Witnesses:
V. C. WILSON,
J. W. BARNACLE.